US005367126A

United States Patent [19]

Kikuchi

[11] Patent Number: 5,367,126
[45] Date of Patent: Nov. 22, 1994

[54] BRANCH LINE APPARATUS FOR A WIRE HARNESS AND A METHOD THEREOF

[75] Inventor: Masanori Kikuchi, Ohta, Japan

[73] Assignee: Fuji Jukogyo Kabushiki Kaisha, Tokyo, Japan

[21] Appl. No.: 977,852

[22] Filed: Nov. 17, 1992

[30] Foreign Application Priority Data

Dec. 4, 1991 [JP] Japan .............................. 3-108355[U]

[51] Int. Cl.[5] .............................................. H02G 3/04
[52] U.S. Cl. ................................ 174/71 R; 174/72 A; 174/135
[58] Field of Search ................ 174/71 R, 72 R, 72 A, 174/135, 136, 138 R, 167

[56] References Cited

U.S. PATENT DOCUMENTS 3,141,251 7/1964 Olson et al. ...................... 174/135 X
3,192,377 6/1965 Abolins .......................... 174/72 R X
3,312,777 4/1967 Lovett, Jr. et al. .............. 174/71 R
4,384,167 5/1983 Nestor ............................. 174/71 R

*Primary Examiner*—Leo P. Picard
*Assistant Examiner*—Hyung S. Sough
*Attorney, Agent, or Firm*—Beveridge, DeGrandi, Weilacher & Young

[57] ABSTRACT

An apparatus for drawing out a branch line is provided in a trunk line of an electric wire harness. The trunk line is covered with a protecting tube which has a slit for easily taking out the branch line at any place. Having a groove for inserting the slit, the apparatus is firmly fixed at a desired position. And the branch line is tightly bound on a pillar-shaped supporting member with a tape.

7 Claims, 3 Drawing Sheets

BRANCH LINE APPARATUS FOR A WIRE HARNESS AND A METHOD THEREOF

BACKGROUND OF THE INVENTION

The present invention relates to a branch line apparatus for a wire harness in an electrical equipment, and more particularly to an apparatus for branching a line from the wire harness laid up in the equipment and for fixing the line at a branched position.

Such a conventional method for branching the line as disclosed in a prior art, i.e., Japanese Utility model Application laid-open 62-76750, is shown in FIGS. 4A and 4B. A branch line 21 is drawn out from a middle position of the wire harness. A cover tube 1 has a slit 11 in a lengthwise direction of the cover tube 1 and is a corrugated tube made from a plastic material, such as a vinyl chloride. In a natural condition, a fringe end of the slit 11 is overlapped each other, so that there is no gap in the tube 1. A partial gap is opened by pushing apart the fringe end. And then, a specific harness as a branch line 21 is drawn out through the gap from a harness bundle 2. The conventional method for branching the line 21 from the cover tube 1 is as follows.

First, the cover tube 1 is divided into two parts as shown in the FIG. 4A. Second, the branch line 21 is taken out from a divided portion of the cover tube 1, and peripheries of the divided portion and the branch line 21 thereof are covered with a tape 3.

Another method is shown in the FIG. 4B. First, the slit 11 of the cover tube 1 is opened, and then the partial gap is formed. Second, the branch line 21 is taken out from the partial gap, and the periphery of the divided portion are covered with the tape 3.

However, according to the conventional method shown in the FIG. 4A, there is no protection for the branch line 21 except the tape 3. The branch line 21 is just covered only with the tape 3, but, insufficient for the protection. And further, a drawing out direction of the branch line 21 is limited.

And, according to the another conventional method shown in the FIG. 4B, as the cover tube 1 is not divided, the protection of the branch line 21 is perfect. However, the fringe edge of the slit 11 tends to damage the branch line 21 after widening the gap. Further, the drawing out direction of the branch line 21 is also uncertain.

SUMMARY OF THE INVENTION

An object of the present invention is to provide a branch line apparatus for a wire harness installed in an electrical equipment and to solve above-mentioned problems.

According to the present invention, there is provided a branch line apparatus having, a wire harness trunk line, a branch line divided from the trunk line, a cover tube for covering the trunk and branch lines, a slit in the cover tube in a lengthwise direction thereof, a joint portion provided in the cover tube, a middle drawing out member provided in the joint portion, a drawing out mouth opened for the branch line in the middle of the joint portion, an insert groove formed under the drawing out mouth, and a branch line support extending upward from a lower edge of the drawing out mouth.

The slit of the cover tube is expanded and an edge of the slit is inserted in the groove, so that a middle drawing out portion is formed. The branch line is supported by winding with a tape on the branch line support of the drawing out member. And then, the joint portion is fixed on the cover tube with the tape.

Another feature of the present invention is to integrally form a clip on the middle drawing out member for fixing the wire harness trunk line.

Further feature of the present invention is that the middle drawing out member is formed in a bent configuration.

Therefore, a branching portion of the wire harness is firmly covered with a protection cover by the above-mentioned method. Moreover, as the edge of the slit is inserted in the groove, there is no problem where the branch line receives damage by the said slit edge because of pushing and being maintained in the expanded state.

In addition, the branch line drawn out is so firmly fixed to the branch line support that there is no problem that the direction of drawing out of the branch line becomes unstable. Furthermore, as the clip is integrally formed on the middle drawing out member, the joint portion becomes a fixed point for drawing the harness around. So that, installation work of the wire harness becomes easy and stabilized. And, as the middle drawing out member has a bent shape, the branch line is hold in a bent condition for easy and effective installation and fixing work with vinyl tape.

The other objects and features of the present invention will become understood from the following description with reference to the accompanying drawings.

DETAILED DESCRIPTION OF THE PREFERRED EMBODIMENTS

Figure 1A:
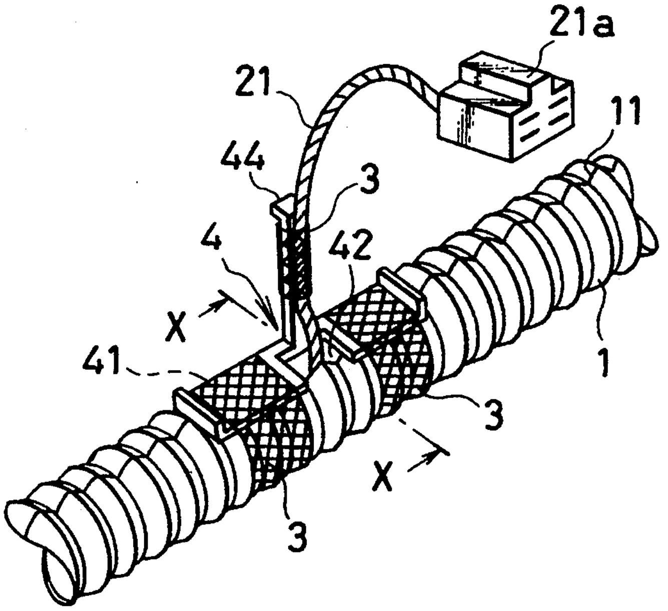
FIG. 1A is a perspective view of the first embodiment of the present invention.
Figure 1B:
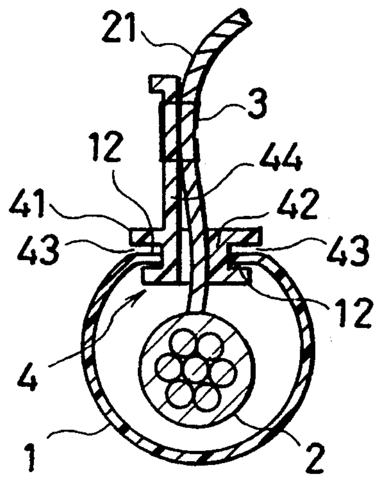
FIG. 1B is a sectional view cut in the direction of X—X of the FIG. 1A.
Figure 2A:
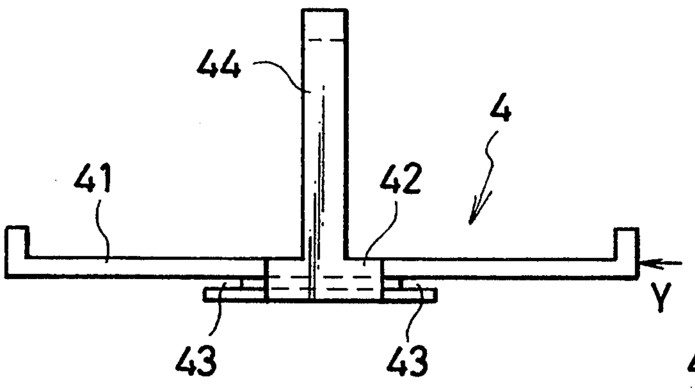
FIG. 2A is a front view of a middle drawing out member.
Figure 2C:
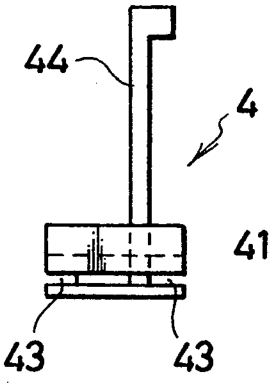
FIG. 2C is the side view along an arrow in the direction of Y of FIG. 2A.
Figure 2B:
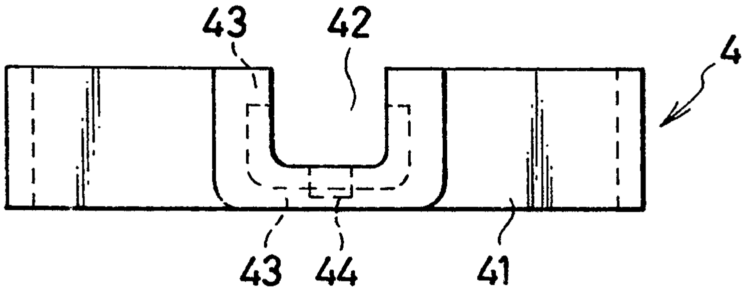
FIG. 2B is a bottom view of the middle drawing out member shown in the FIG. 2A.
Figure 2D:
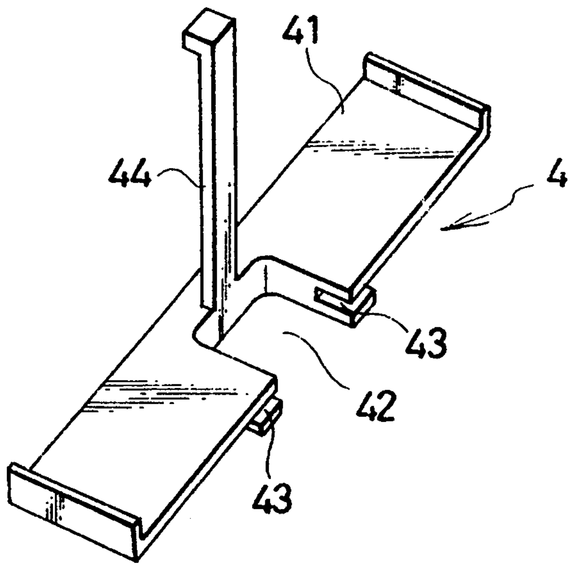
FIG. 2D is the perspective view of the FIG. 2A.

The example of executing this invention is explained referring to the drawings. The first embodiment of the present invention is shown in FIGS. 1A, 1B and 2A–2D. In FIGS. 1A and 1B, numeral 1 indicates a cover tube. A harness bunch 2 is included in the cover tube 1. A middle drawing out member 4 is inserted in the cover tube 1 which is made from a conventional corrugated tube with a slit 11 in a lengthwise direction. The material of the cover tube 1 is, for instance, a plastic such as a vinyl chloride. A edge 12 of the slit 11 overlaps each other without the space, but is openable by fingers. That is, a space can be partially made by enlarging and expanding the slit 11 as the conventional corrugated tube. The harness bunch 2 is inserted in the cover tube 1 and a trunk part of the harness is formed. The middle drawing out member 4 has a configuration shown in the FIGS. 2A–2D. The middle drawing out member 4 comprises a joint portion 41 which is connected and is fixed to the cover tube 1. A drawing out mouth 42 for a branch line 21 is formed on the joint part 41 in the manner of partially cutting an approximately center portion of the middle drawing out member 4. An insert groove 43 is formed under a periphery of the drawing out mouth 42 for inserting the edge 12 of the cover tube 1. A branch line support member 44 is integrally formed to stand up from near the drawing out mouth 42 toward the opposite direction of the insert groove 43. And, the slit 11 of the cover tube 1 is pushed, and expanded as shown in the FIG. 1B. The edge 12 is inserted in the insert groove 43, and the cover tube 1 firmly engaged with the middle drawing out member 4. The joint portion 41 of the middle drawing out member 4 is connected to the cover tube 1. Then, the space between the edge 12 pushed aside by the groove 43 and the other side of the edge 12 becomes the drawing out mouth 42. The branch line 21 is drawn out from the drawing out mouth 42 and the joint portion 41 is fixed to the cover tube 1 with a tape 3 as shown in the FIG. 1A afterwards. As a result, the protection of the branch line 21 becomes complete by fixing the branch line 21 to the support part 44 with the tape 3. The branch line 21 does not receive any damage by the edge 12 and the fixation becomes certain.

In addition, the drawing out direction at the branch point was firmly decided by the support member 44. Numeral 21*a* shows a connector for connecting the branch line 21 to a corresponding electrical equipment as shown in FIG. 1A.

A modified configuration is as follows. Any direction of drawing out can be decided by changing the standing up angle or the curved form of the support member 44 of the middle drawing out member 4.

Figure 3A:
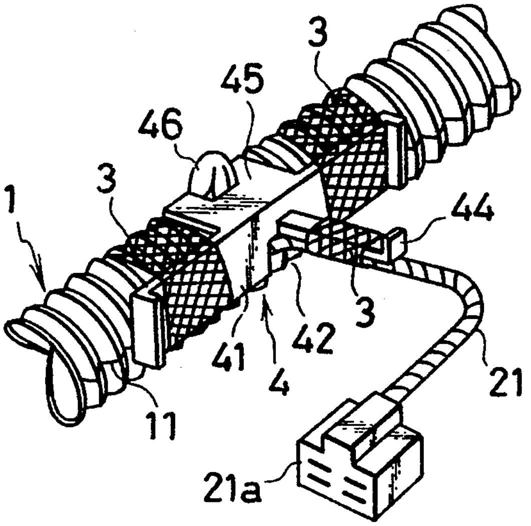
FIG. 3A shows the perspective view of the second embodiment of the present invention.
Figure 3B:
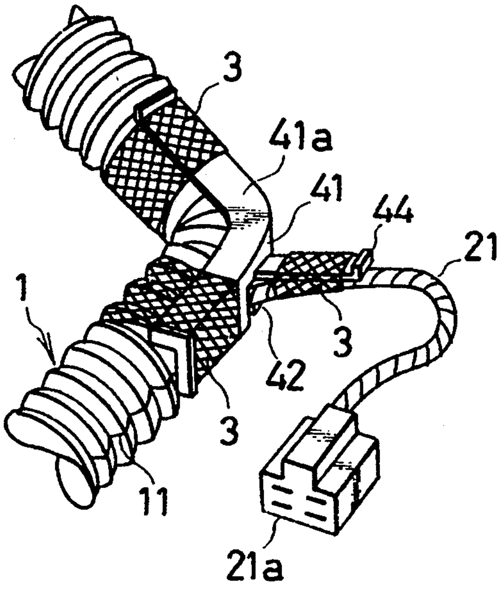
FIG. 3B shows the third embodiment according to the present invention.
Figure 4A:
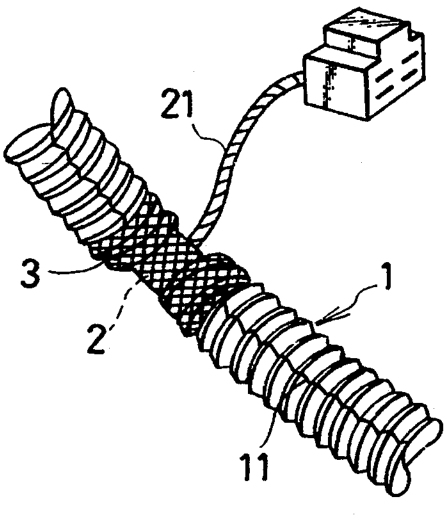
FIG.4A PRIOR ART
FIGS. 4A and 4B show the prior art.
Figure 4B:
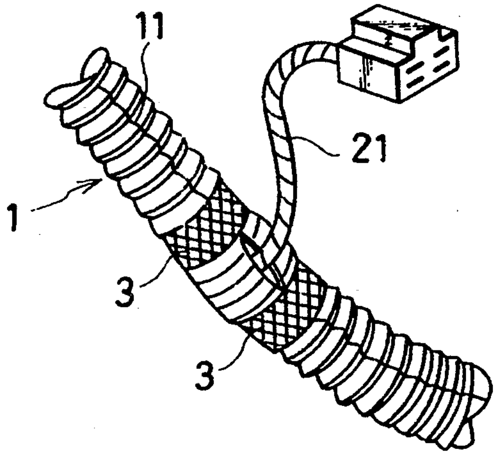
FIG.4B PRIOR ART

FIGS. 3A and 3B show the second and third embodiment of the present invention. That is, the FIG. 3A shows the middle drawing out member 4 which consists of the joint portion 41, the drawing out mouth 42, the insert groove 43, and the branch line support member 44. And, a clip 46 is integrally formed on a plane 45 to fix the harness trunk line 2. The harness trunk line 2 is fixed to the equipment by pushing into the installation hole (not shown), by which the harness is firmly supported. As a result, the branch line 21 is also correctly fixed to the trunk line. Therefore, stabilization and the simplification and easy drawing out work are obtained. In the FIG. 3B, the joint portion 41 is wound at the center portion with the tape, including the middle drawing out member 4 which consists of the drawing out mouth 42, the insert groove 43, and the branch line support member 44. As a result, it will be able to stabilize the harness trunk line and the branch line at a desired position. In this case, a standing up wall 41*a* is formed at a side edge of the joint portion 41. It is preferable to make the wall 41*a* into a shade having a section of C-channel or L-shape in order to keep strength for tightly winding the harness trunk line with the tape.

Moreover, the harness trunk line can be strongly fixed to the standing up wall 41*a* with the clip 46 as shown in the FIG. 3A. It is needless to say that the structure of the FIG. 3B has the same advantage as that of the embodiments shown in the FIG. 1A and 1B.

The branch line can be drawn out easily and certainly without dividing the protection exterior or damaging the branch line by the exterior edge as mentioning above according to the present invention.

In addition, the harness trunk line can be easily fixed in a desired direction of drawing out of the branch line with the middle drawing out member in a correct bending angle.

Further, the drawing work of the harness trunk line is effectively simplified and firmly stabilized.

While the presently preferred embodiments of the present invention have been shown and described, it is to be understood that these disclosures are for the purpose of illustration and that various changes and modifications may be made without departing form the scope of the invention as set forth in the appended claims.

What is claim is:

1. A branch line supporting apparatus for use with a wire harness which wire harness has a bunch line formed of a bundle of a plurality of electric wires, and a branch line divided from said bunch line and a cover tube with a slit in a lengthwise direction of said cover tube for drawing out said wire harness bunch line, the apparatus comprising:

- a joint portion provided to connect to said cover tube;
- a drawing out mouth provided in said joint portion as a cutout having an open end for drawing out said branch line from said bunch line to an outside of said cover tube;
- an insert groove outwardly provided on the outer periphery of said drawing out mouth for engaging with an edge of said slit of said cover tube; and
- a branch line support member perpendicularly extended from said joint portion in opposite direction of said insert groove for supporting said branch line with a fastener so as to correctly decide a drawing out direction of said branch line and to firmly fix said wire harness without damage.

2. The apparatus according to the claim 1, further comprising

- a clip portion formed integrally on a plane extending from said joint portion in opposite direction to said branch line support member for easy installation and stable fixation of said harness trunk line.

3. The apparatus according to the claim 1, wherein

- said joint portion is formed in a bent configuration at almost near middle position.

4. A supporting apparatus of a branch line from a trunk line of a wire harness formed of a bundle of a plurality of electric wires and covered with a tube having a slit in a lengthwise direction for drawing out said branch line therefrom, an improvement of the apparatus which comprises:

- a pair of flat joint plane members provided in said supporting apparatus in a longitudinal direction over said slit;
- a drawing-out mouth provided between said pair of flat joint plane members and with an open end at one side of said mouth in a lateral direction;
- an insert groove formed on an underneath periphery of said drawing-out mouth for engaging one side of said slit of said tube; and
- a branch line support member which is a pillar formed at an opposite side of said open end and outwardly extended for supporting said branch line by winding with a tape so as to correctly direct said branch line in a desired direction and to firmly fix all of said wire harness by said tape without internal movement.

5. A method for supporting a branch line from a trunk line of a wire harness formed of a bundle of a plurality of electric wires and covered with a tube having a slit in a lengthwise direction for drawing out said branch line therefrom, the method comprising:

providing a tube having a slit in a lengthwise direction, placing a wire harness bunch line inside of said tube in a longitudinal direction through said slit;

drawing out a branch line from a drawing-out mouth located between a pair of flat joint plane members;

inserting opposite sides of the tube slit into an insert groove on an underneath periphery of said drawing-out mouth;

engaging one side of said slit of said tube into said groove;

providing a pillar-shaped branch line support member at an opposite side of said open end toward an opposite direction of said groove; and winding said branch line with a tape so as to correctly direct said branch line in a desired direction and to firmly fix all of said wire harness by said tape without internal movement.

6. The method according to the claim 5, further comprising the step of forming a clip portion integrally on a plane extending from said joint portion opposite direction to said branch line support member for easy installation and stable fixation of said harness trunk line.

7. The method according to the claim 5, wherein bending said joint portions at almost near middle position.

* * * * *